United States Patent [19]

Paananen et al.

[11] Patent Number: 5,851,405
[45] Date of Patent: Dec. 22, 1998

[54] PROCESS FOR CLARIFYING VINASSE

[75] Inventors: Hannu Paananen, Kantvik; Mirja Lindroos, Kirkkonummi; Tapio Viljava; Pertti Walliander, both of Kantvik, all of Finland

[73] Assignee: Cultor Oy, Helsinki, Finland

[21] Appl. No.: 765,492

[22] PCT Filed: Jun. 7, 1995

[86] PCT No.: PCT/FI95/00328

§ 371 Date: Mar. 24, 1997

§ 102(e) Date: Mar. 24, 1997

[87] PCT Pub. No.: WO96/00775

PCT Pub. Date: Jan. 11, 1996

[30] Foreign Application Priority Data

Jun. 28, 1994 [FI] Finland ..................... 943106

[51] Int. Cl.$^6$ ............... B01D 21/26; C02F 1/66
[52] U.S. Cl. ............ 210/724; 210/774; 210/781; 210/787; 426/7; 426/443
[58] Field of Search .................. 210/724, 728, 210/767, 774, 781, 787; 426/472, 478, 492, 7, 443; 562/513

[56] References Cited

U.S. PATENT DOCUMENTS

| 2,165,950 | 7/1939 | Willkie et al. . | |
|---|---|---|---|
| 2,225,428 | 12/1940 | Christensen et al. . | |
| 2,263,608 | 11/1941 | Brown . | |
| 2,292,769 | 8/1942 | Pattee . | |
| 2,391,918 | 1/1946 | Pattee . | |
| 2,404,398 | 7/1946 | Pattee . | |
| 3,968,739 | 7/1976 | Stoltenberg . | |
| 3,969,537 | 7/1976 | Stoltenburg . | |
| 4,273,659 | 6/1981 | Robertiello et al. ............. | 210/728 |
| 4,604,125 | 8/1986 | Robertiello et al. . | |
| 5,593,600 | 1/1997 | Solomon ............. | 210/787 |
| 5,760,078 | 6/1998 | Hamstra et al. ............. | 210/443 |

FOREIGN PATENT DOCUMENTS

| 0 411 780 A2 | 2/1991 | European Pat. Off. . |
| 3502217 A1 | 7/1986 | Germany . |

Primary Examiner—David A. Reifsnyder
Attorney, Agent, or Firm—Scully, Scott, Murphy & Presser

[57] ABSTRACT

The invention relates to a process for preparing vinasse suitable for a column process, in which process dilute vinasse is clarified by means of a high-efficiency centrifuge, after which the vinasse is concentrated and potassium is removed. The invention also relates to the vinasse and the potassium sulphate crystals prepared with the above-described process.

12 Claims, No Drawings

PROCESS FOR CLARIFYING VINASSE

TECHNICAL FIELD

The invention relates to a novel process for clarifying vinasse. More specifically, the invention describes a process where dilute vinasse is clarified by means of a high-efficiency centrifuge. The vinasse is then concentrated and potassium is removed through the controlled crystallization of potassium salts and the separation of these crystals from the liquid.

BACKGROUND

Beet molasses and also beet juice are used as raw material in a wide range of fermentation industries in producing alcohol, yeast, citric acid, glutamic acid, lysine and many other fermentation products. When the primary product has been recovered from the fermentation broth, a dilute by-product broth remains. When this dilute by-product is concentrated, it is generally called "vinasse". The traditional uses of vinasse have been its disposal as waste to the environment (often without concentration), its use as a potassium fertilizer, and its use as an additive in cattle feed. Environmental restrictions have limited the former and consequently increased the use for the latter two purposes. The demand for these two purposes is limited, however, and a serious oversupply situation thus exists on the market. Therefore there is an increased interest in recovering valuable components from vinasse.

For example betaine can be recovered through chromatographic separation method as described in U.S. Pat. Nos. 4,359,430 and 5,127,957 (Heikkila et al.). Betaine can also be recovered by utilizing ion exchangers, which may be either cationic or anionic. Other components which can be recovered are glycerol, monosaccharides, amino acids and succinic acid. The recovery of glycerol and glucose, and the separation of amino acids is described in Burris, B. D., 1986: *Recovery of Chemicals such as Glycerol, Dextrose, and Aminoacids from Dilute Broths*, International Conference on Fuel Alcohols and Chemicals from Biomass, Miami Beach, Fla. European Patent Application 0,411,780 A2 (Kampen) discloses the recovery of, for example, glycerol, betaine and succinic acid.

The greatest problem with the known methods has been that the column processes such as the chromatographic separation and ion exchange necessitate the use of raw material which contains no substantial amounts of insoluble solids. The clarification of vinasse has been highly expensive and difficult. Vinasse pretreated with known methods is unstable and causes postprecipitation, whereupon the resin used in the column processes rapidly becomes dirty. Due to these problems, it has been in practice highly uneconomical and even impossible to perform the above-described column processes as long-term continuous processes.

For example after alcohol production through yeast fermentation, yeast has in some cases been separated and a part of it has been recirculated back to the fermentation stage, whereas a part has possibly been concentrated to dry yeast. However, the separation of yeast is not then efficient enough, but the fraction transferred to the distillation stage following the separation generally contains over 1% by volume of yeast. After the distillation stage and the concentration of dilute vinasse, the amount of yeast has increased to about 6 vol-%, while the amount of solid salts also increases to about 6 vol-%. Yeast is lighter than concentrated vinasse, whereas solid salts are heavier, whereupon they cannot be separated in a simple manner in one stage.

The process for recovering components from the by-product of fermentation described in European Patent Application 0,411,780 A2 (Kampen) also comprises a clarification step where the by-product obtained after fermentation and distillation is micro-filtered by using inorganic membranes having a pore size in the range of about 0.1 to 10 microns. Example 8 of the reference describes a process for clarifying beet stillage. The beet stillage is a by-product of the fermentation of sugar beet into ethanol, and it is clarified with a process where the stillage is subjected to cross-flow microfiltration utilizing inorganic alpha aluminium oxide membranes having a pore size of 0.2 microns, the permeate is treated enzymatically at 50° C. to hydrolyse proteinaceous matter, evaporated into a solids content of over 66 wt.-%, and crystallized by cooling and crystallizing, in a malaxeur, potassium sulphate crystals which are removed through centrifugation. The beet stillage clarified in this way is then subjected to several steps of chromatographic separation to recover betaine and glycerol.

The process is very expensive for several reasons. Firstly, the liquid flux through the membranes is very small, requiring thus an extensive membrane surface to process reasonable amounts of vinasse. A microfiltration plant having a sufficient surface is a big investment, and its operation and maintenance will also be very costly. Another problem is that the long-term stability of commercially available membranes is not sufficient in practice.

Secondly, the composition of vinasse is not accurately specified, wherefore the enzymatic treatment is difficult. The available protease enzymes have been developed for a different purpose, and therefore their activity and stability are not optimized for this application. This leads to a highly expensive enzyme treatment step.

Thirdly, the potassium sulphate precipitation is performed through cooling crystallization in a malaxeur after the vinasse has been concentrated by means of evaporation to over 66 wt.-%. It is difficult to control the crystallization, wherefore the distribution of crystal size becomes very poor. The crystallization stage produces a concentrated and viscous vinasse mass, which contains very fine crystals, which is difficult to process and from which it is very hard to separate crystals. As Kampen states too, the separation of crystals calls for a system of centrifugation, crystal washing and drying, thus increasing the process steps and costs.

BRIEF DESCRIPTION OF THE INVENTION

The invention relates to a novel process for clarifying vinasse. In the process according to the invention, dilute vinasse is clarified by means of a high-efficiency centrifuge. The clarified liquid is concentrated. During the concentration step, the potassium salts are precipitated or crystallized in a controlled manner, and the precipitate or the crystals are separated from the concentrated vinasse. According to the invention, the separation of yeast is made more effective so that the amount of yeast remains clearly below 1%, even below 0.1%. This is possible when according to the invention vinasse is clarified when it is dilute, since yeast is then heavier than vinasse.

The process according to the invention for clarifying vinasse provides a stable and safe substrate for column processes, like chromatographic separation and/or ion exchange. The process according to the invention is simple, and it can be performed easily with available equipment. The process according to the invention is thus considerably cheaper than the known processes, both for investments and operation costs.

The invention also relates to vinasse clarified in the above-described manner. The vinasse clarified according to the invention is stable and can be stored and transported as such. The vinasse clarified according to the invention is also very well applicable as substrate in column processes.

The invention also relates to potassium salt crystals produced with the above-described process. The potassium salt crystals produced according to the invention are of considerably better quality than the crystals produced with the prior art processes, especially if they are combined with the potassium sulphate fractions obtained after the column process(es) of the clarified vinasse.

DETAILED DESCRIPTION OF THE INVENTION

The invention thus relates to a novel process for clarifying vinasse by clarifying, concentrating and removing potassium. The process according to the invention is characterized in that dilute vinasse is clarified by means of a high-efficiency centrifuge.

The clarification is performed preferably on dilute vinasse with a pH value between 5 and 11. Even more preferably, the pH is adjusted to a value of about 6.5 to 7.5. The vinasse to be processed may be a dilute fermentation by-product, taken as such from the fermentation process. The dry solids content of such vinasse is about 3 to 16% by weight. The potassium content of the vinasse is about 11 to 13% and betaine content about 11 to 19% based on the dry solid matter. The process according to the invention is also applicable for conventional concentrated vinasse, which is then diluted before clarification.

The dilute vinasse is clarified by means of a high-efficiency centrifuge, such as a high-efficiency clarifier centrifuge. A suitable device is for example a disc stack clarifier centrifuge. The clarification is performed at a low solids content. The solids content should be less than 35 weight/weight-%, preferably 3 to 25 weight/weight-%. The best clarification result is achieved by performing this stage when the solids content is as low as possible right after the primary fermentation product has been separated from the dilute vinasse and the dilute vinasse has been subjected to heat treatment at over 70° C., preferably over 90° C.

For example in the production of alcohol, yeast is separated by means of a yeast centrifuge, and the supernatant is distilled in order to separate alcohol from the dilute vinasse. The dilute residual solution of the distillation forms the dilute vinasse, and it can be clarified with the aforementioned high-efficiency clarifier centrifuge. In the production of yeast, the yeast is also separated from the fermentation broth through centrifugation. The resultant dilute vinasse is subjected to heat treatment or concentration to a content of over 10 weight/weight-%. In the heat treatment, the proteins are precipitated, and the proteinaceous dry solid matter is then easier to separate. The heat treatment may be performed as a separate step, or it may be realized simultaneously with some other step. For example the distillation step of the alcohol production is a sufficiently effective step of heat treatment to provide a good result. The pH of the dilute vinasse which has undergone the heat treatment is adjusted to a value with which it is possible to provide good stability to avoid post-precipitation in the following column processes. The pH value is not very significant for the clarification itself. Generally the pH is about 5 to 11, preferably about 6.5 to 7.5. Any substance, such as sodium hydroxide or sodium carbonate, used normally to adjust the pH can be used here. The dilute vinasse is then clarified by means of a high-efficiency centrifuge. The clarification is performed optionally at an elevated temperature of over 70° C., preferably over 90° C., whereupon no separate heat treatment is needed.

The clarified vinasse is then concentrated in an evaporator system to a dry solids content of about 50 to 80 wt.-%, preferably about 55 to 65 wt.-%. The potassium salts are precipitated or crystallized during the concentration preferably in a controlled manner. The concentration is preferably performed in such a way that the dry solids content does not rise above the value needed for separating the crystals. A very high dry solids content results in a viscous mixture, which makes it more difficult to separate the crystals. Potassium is precipitated in the form of a salt and/or a double salt. The salt formation depends on how many ions available for salt formation are present. Generally there are enough sulphate ions present. The formation of the potassium, crystals can also be controlled by adding a desired amount of a suitable acid, for example sulphuric acid, which provides $S_4^2$ ions for use. It is preferable to perform the concentration to a higher dry solids content than what is used in the following column process, since the liquid can then be diluted before the column-process. Such a dilution step increases the certainty that all insoluble agents, such as supersaturated potassium salts, have been removed before one column processes. The potassium salts begin to precipitate/crystallize when the dry solids content rises above 35 wt.-%. The evaporator where the concentration is then performed should preferably be an evaporation crystallizer (a forced-circulation flash evaporator, a forced circulation evaporator, a DTB evaporator, a continuous agitated pan crystallizer, etc.), so that the crystallization, i.e. the formation of crystal nuclei, and the growth and size of the crystals, can be controlled better.

The potassium salt/crystals are separated from the concentrated vinasse for example through decantation, filtration or a combination of these processes.

The decanted liquid is filtered by means of pressure filters by using filter plates, filter aid or a combination of these.

After the filtration, clarified and stable vinasse, highly applicable for column processes, is obtained. The clarified vinasse may be stored or used immediately in a column process to recover desired components. It is preferable to subject the vinasse, immediately before the column process, to a check filtration, after which the vinasse is diluted, if desired, by about 2 to 20 wt.-%.

The potassium salt precipitate or crystal slurry obtained as a by-product can be used as such or combined with a by-product having a high potassium content, the by-product being obtained when components have been recovered from the clarified vinasse by means of a column process. The latter embodiment is considered preferable.

The following detailed examples are provided to illustrate the invention. It is clear for one skilled in the art that the described process steps and parameters may be modified without deviating from the basic idea of the invention. Thus the examples should not be understood as limiting the scope of the invention.

EXAMPLES

Examples 1

After the fermentation stage of alcohol production, yeast was removed from the fermented mash through centrifugation. The mash was then conveyed to a distillation column, where the alcohol was removed. The column bottoms formed dilute vinasse, which still contained about 0.05 to 1.5% by volume of insoluble solids. The solids are typically formed of small yeast cells, other microbial cells, debris from broken cells, etc. The dry solids content of the liquid varied between 6.5 and 13 wt.-%.

The solids-containing liquid was heated to about 85° to 95° C. The pH was adjusted to a value of about 6.5 to 7.0, and the liquid was clarified in a disc stack clarifier centrifuge (Westfalia SB7) at a rotational speed of 8500 rpm. The rotational speed of 8500 rpm gives 9000 as the maximum g value on the outer circle of the centrifuge. With this type of device the clarification takes place, however, mainly in the disc stack, where the g values are considerably lower, i.e. in the range of 2000 to 5000 g. On the basis of the description of the invention, it is clear for one skilled in the art that for the purpose of the invention the higher the g value, the better. Thus the g value may vary, depending on the type of device, over a wide range, from about 2000 to about 15 000 g. The clarified liquid typically contained about 0 to 0.05% of insoluble solids. The efficiency of the insoluble solids removal was thus typically over 90%.

The clarified vinasse was then concentrated in a forced-circulation evaporator (Rosenlew) to a solids content of about 59 to 65%. The evaporation unit had been designed for the processing of crystallizing material. Potassium sulphate crystals began to form at a dry solids content of about 40 wt.-%. When the dry solids content was about 60 wt.-%, the viscosity of the crystal slurry increased rapidly and the heat transfer rate of the evaporator decreased quickly. Therefore the final dry solids content was limited to this level in this test. In large scale production, the product can be concentrated to a higher dry solids content (even over 70 wt.-%).

The potassium sulphate crystals were removed as a slurry through decantation. The crystals sank to the bottom, and the relatively clear liquid was decanted from the top. Decantation based on gravity was used here. It is evident to one skilled in the art that it is also possible to use other methods and means, for example a centrifugal decanter.

The potassium salt crystals were recovered from the slurry with a filter press (Seitz Orion) comprising paper filter plates (Carlson). The crystals can also be recovered by means of other types of filters or, for example, a basket centrifuge having a perforated or a net-like screen.

The decanted liquid was also filtered with a filter press (Seitz Orion) with paper filter plates (Carlson) to remove the fine crystals and the remaining insoluble solids. A filter aid (Kenite 300) was also used. The filtration was very easy to perform, and the solids space of the filter was filled almost completely during the process.

As a comparison, a corresponding filtration was performed on vinasse with no prior clarification, and the filtration was very difficult. The differential pressure on the filter rose sharply, and the filter was clogged after a very short time.

An pilot scale test was also performed, in which test vinasse pretreated according to the invention and vinasse which had not been pretreated were subjected to chromatographic separation, The experiment was continued for three weeks for the vinasse pretreated according to the invention, and only very small amounts of dirt gathered on the resin during that time. As for the vinasse which had not been pretreated, the resins used in the chromatographic separation collected a lot of dirt and were clogged completely in a considerably shorter period: they remained in workable order only from one day to two weeks.

Example 2

Dilute vinasse was prepared as in Example 1, but after distillation it was concentrated in a falling-film-type evaporator unit at the temperature of 110° to 125° C. The dry solids content of the liquid varied after the concentration stage from 13 to 21 wt.-%. The content of insoluble solids was 0.25 to 1.3% by volume.

The solids-containing liquid was then cooled to 85° to 95° C. The pH was adjusted to about 6.5 to 7.5, and the liquid was clarified in a high-efficiency clarifier centrifuge (Westfalia SB7) at a rotational speed of 8500 rpm. The clarified liquid typically contained about 0 to 0.05% of insoluble solids. The efficiency of the insoluble solids removal was thus typically above 90%.

The clarified vinasse was concentrated in the manner described in Example 1 with similar results.

The potassium sulphate crystals were removed in the manner described in Example 1.

The decanted vinasse was filtered in the manner described in Example 1.

The vinasse pretreated in this manner was subjected for three weeks to a test of pilot scale chromatographic separation in the manner described in Example 1, with similar results. The pretreatment thus efficiently prevented the contamination problems of the column process.

Example 3

After the fermentation stage of yeast production, yeast was removed from the fermented mother liquor through centrifugation. The mother liquor formed dilute vinasse which still contained about 0.01 to 0.8% by volume of insoluble solids. The solids are typically formed of small yeast cells, other microbial cells, debris from broken cells, etc. The dry solids content of the liquid varied between 3 and 7 wt.-%.

The solids-containing liquid was heated to about 85° to 95° C. The pH was adjusted to a value of about 6.5 to 7.0, and the liquid was clarified with a disc stack clarifier centrifuge (Westfalia NA7) at a rotational speed of 8500 rpm. The clarified liquid typically contained about 0 to 0.05% of insoluble solids. The efficiency of the insoluble solids removal was hence typically above 90%.

The clarified vinasse was concentrated in the manner described in Example 1 with similar results.

The potassium sulphate crystals were removed in the manner described in Example 1.

The decanted vinasse was filtered in the manner described in Example 1.

The vinasse pretreated in this manner was subjected to a test of pilot scale chromatographic separation in the manner described in Example 1, with similar results. The pretreatment thus prevented the contamination problems of the column process.

Example 4

Fresh vinasse obtained from distillation and having an average dry solids content of 11.7% was heated to 85° to 95° C., after which the pH was adjusted to a value of about 6.5 to 7.0. The hot vinasse was clarified in a disc stack clarifier centrifuge, from where it was continuously fed to a forced-circulation evaporator of the rising film type and concentrated to a dry solids content of 60±1%. The concentrated vinasse was decanted by passing it through a settling tank with the residence time of 10 hours. The slurry containing precipitated potassium sulphate was removed from the bottom of the tank at a volumetric rate of 10% of the total flow. The dry solids content of the slurry was 67%. The slurry was heated to 60° C. and passed through a plate-and-frame type filtering unit (Seitz Orion) with a filter surface of 2.8 m². After the filtration of 270 l of the slurry, the filtering pressure rose sharply indicating thus that the filter chambers were full. The filtering was then ended, and the liquid in the filter a chambers was replaced with air. The filtering unit was opened and the filter cake of 90.5 kg was recovered. The cake had a dry solids content of 78.4%, of which potassium comprised 25.9%.

The decanted liquid having a dry solids content of 58.5%, of which potassium comprised 10.4%, was heated to 90° C. and filtered using the same filtering unit. Diatomaceous earth (Kenite 300) was used as filter aid, the dosage varying from 0.2 to 0.4% (w/v). The slurry filtrate, 210 l in volume and with a dry solids content of 60.1%, was combined with the 2430 litres of the decantation overflow filtrate. The combined clear filtrate was diluted to a dry solids content of 50%, check-filtered, and passed to a column process to recover a betaine fraction.

We claim:

1. A process for pretreating vinasse for use in a subsequent chromatography process, comprising clarifying dilute vinasse containing potassium salts in solution and insoluble solids having an insoluble dry solids content of below 35 wt. % utilizing a clarifier centrifuge whereby at least 90% of said insoluble solids is removed therefrom, concentrating the clarified vinasse to a dry solids content to about 50 to about 80 weight %; and removing potassium in the form of a potassium salt therefrom.

2. The process according to claim 1, characterized in that the dry solids content of the dilute vinasse is from 3 to 25 wt. %.

3. The process according to claim 1, characterized in that the dilute vinasse has its pH adjusted before clarification to a value of about 5 to 11.

4. The process according claim 3 wherein said pH of said vinasse is adjusted to 6.5 to 7.5 prior to clarification.

5. The process according to claim 1, characterized in that the vinasse is subjected to heat treatment before clarification or simultaneously with it.

6. The process according to claim 5, characterized in that the heat treatment is carried out at a temperature of over 70° C.

7. The process according to claim 6 wherein said temperature is over 90° C.

8. The process according to claim 1, characterized in that the concentration step is performed by evaporating the vinasse.

9. The process according to claim 1, characterized in that the concentration is performed by evaporating the vinasse into a dry solids content of about 55 to 65 wt. %.

10. The process according to claim 1, characterized in that said potassium salt is potassium sulphate which is removed from the vinasse through crystallization in a controlled manner.

11. Then process according to claim 1 further comprising diluting the vinasse prior to introduction into a chromatography column.

12. The process according to claim 11, characterized in that the vinasse is diluted by 2 to 20 wt. %.

* * * * *

UNITED STATES PATENT AND TRADEMARK OFFICE
CERTIFICATE OF CORRECTION

PATENT NO. : 5,851,405
DATED : Dedcember 22, 1998
INVENTOR(S) : H. Paananen, et al.

It is certified that error appears in the above-identified patent and that said Letters Patent are hereby corrected as shown below:

Column 8, Line 26, Claim 11: "Then" should read --the--

Signed and Sealed this

First Day of May, 2001

NICHOLAS P. GODICI

Attest:

Attesting Officer   Acting Director of the United States Patent and Trademark Office